Patented July 8, 1924.

1,500,844

UNITED STATES PATENT OFFICE.

HERMANN PLAUSON, OF HAMBURG, GERMANY.

OIL-SOLUBLE DYESTUFF.

No Drawing.    Application filed February 12, 1921.   Serial No. 444,493.

*To all whom it may concern:*

Be it known that I, HERMANN PLAUSON, Esthonian subject, residing in Hamburg, Germany, have invented certain new and useful Oil-Soluble Dyestuffs, of which the following is a specification.

This invention relates to certain new resins and oil-soluble dyestuffs.

According to the invention I obtain compounds of diazo or azo compounds or the like with artificial resins or partly condensed or polymerized products, or with the raw material prior to condensation, so as to obtain azo-resins or azo intermediate products of properties hereafter described; or the diazo compounds may be prepared in presence of the materials in question, e. g. the resins or less condensed products may be mixed with aromatic amino compounds and the mixture then diazotized. Thus the new materials for resins may be treated at once or after suitable condensation with suitable azo components, e. g. nitroaniline and the like (with subsequent diazotization). Valuable novel azo-resins are obtained which are improved resins and also serve as excellent dyestuffs; they can be used as fat- and oil-soluble varnishes which can be used for paper textile fabrics or leather, or for other purposes, e. g. for application to wood, metals, etc., on which they form a good bright hard and polishable coating. The material can be used for electrical insulation or as a substitute for shellac or the like. The materials can be employed in pyrotechnics for making artificial flames. More or less water-soluble dyes can be obtained by sulphonating the products or by employed sulphonated materials in their manufacture.

Example 1.

Phenol and formaldehyde or hexamethylene tetramine can be condensed to yield a fast azo resin as follows:—

94 parts of crystallized phenol are melted with about 7½ parts (by weight) of hexamethylene tetramine and well stirred, while a calculated amount of diazotized p. nitroaniline is added. The mixture at once assumes an intense red to orange colour, and on cooling is converted into a solid metallic-green or orange coloured azo-resin which dissolves in oils and fats to give an intensely orange colour.

Formaldehyde or paraformaldehyde can be used if desired. Phenol may be replaced by its monohydroxy or polyhydroxy homologues, or the phenol may be sulphonated initially or later, so as to give water-soluble azo bodies which have a combined dyeing and tanning action.

More or less greenish coloured bodies can be obtained from chlorinated phenolic raw materials by suitable variations of time and temperature of treatment.

The resin can also be made from an aldehyde or ketone instead of phenol; preliminary condensation may be effected with the aid of an alkali, an alkaline carbonate or even an alkaline sulphide.

Example 2.

3 molecular proportions of formaldehyde and 1 molecular proportion of acetone are mixed with ½ molecular proportion of anhydrous potash at a temperature of 30°–60° C. till an oily liquid is obtained by condensation. After neutralization and removal of water there is added a calculated amount of diazotized p. nitroaniline (or another azo component) while stirring well and the mixture is maintained at say 30°–60° C. till coupling has taken place. The resulting dark yellow body is a good azo resin component or dyestuff.

A bluish resin can be obtained by condensing phenol with furfurol and coupling as above.

Cumarone resins, or naphthol or dinaphthol resins, or semi-condensation products can also be used.

Vinyl compounds such as vinyl halides or esters can also be used, and the coupling may be effected before or during polymerization as required. The semi-condensation products may be stirred with a suitable diazotized amine in an autoclave, or allowed to stand in a closed vessel, when greenish-red azo resins are obtained which are very tough and can be used for varnishes &c. Other vinyl esters can be simultaneously azotized and polymerized.

Further, excellent results can be obtained from pure vinyl hydrocarbons, e. g. butadiene, isoprene and homologues thereof, by polymerization at a low temperature in presence of suitable azo components, preferably under increased pressure. The resulting azo resins are red to black or dark green in colour and are highly elastic. These azo resins from vinyl hydrocarbons can be used for excellent varnishes or worked up into a very useful linseed oil substitute.

In many cases it is of advantage to perform the reaction in presence of solvents with or without increase of temperature and (or) pressure; the use of a solvent will moderate the violence of the reaction in the above examples. Obviously mixtures of various semi-condensates or polymerization products can be azotized. In general, if the raw materials are coupled with the diazo body before polymerization the reaction tends to be violent, so that it may be advisable to moderate it in various ways, e. g. by cooling or addition of a solvent or preferably by allowing the condensation to proceed partially before coupling. On the other hand it is difficult to perform the reaction if complete condensation to a finished resin takes place before addition of the coupling reagent.

In describing the new bodies as azo resins, it is not desired to set forth any theory as to their constitution which appears to be extremely complex; they may not contain the azo group as such, and they are defined by their novel properties, namely that they represent resins containing a chromophoric nitrogen group or groups, which resins are usually oil-soluble. Preferably they are obtained from diazo compounds but often suitable aromatic nitrogen compounds can be used such as azo or azoamido compounds. But in any case the azo resins according to the invention contain the chromophoric group in combination with the resin constituents as the result of a condensation or coupling, and such resins differ from a mere solution of a small quantity of a dye-stuff in a resin of known kind.

I declare that what I claim is:—

1. Artificial azo-resins.
2. Artificial oil-soluble azo-resins.
3. Artificial oil-soluble azo-resins having dyeing properties.
4. Artificial resinous azotized condensation products.
5. The process of preparing azo resins which comprises coupling resin components with an aromatic diazo compound.
6. The process of preparing azo resins which comprises condensing resin components in presence of a diazo compound.
7. The process of preparing synthetic resins by condensation of resin components which includes the step of adding a diazo compound prior to complete condensation.

In witness whereof, I have hereunto signed my name this 26th day of January, 1921.

HERMANN PLAUSON.